United States Patent Office 3,459,831
Patented Aug. 5, 1969

3,459,831
BLOCK COPOLYMER-POLYETHYLENE FILMS
Murray A. Luftglass and Willis R. Hendricks, Palos Verdes Peninsula, Calif., assignors to Shell Oil Company, New York, N.Y., a corporation of Delaware
No Drawing. Filed Sept. 24, 1965, Ser. No. 490,065
Int. Cl. C08f 29/10, 29/12, 47/14
U.S. Cl. 260—876                                    3 Claims

ABSTRACT OF THE DISCLOSURE

A transparent film is provided of a blend of a high molecular weight block copolymer such as styrene-butadiene-styrene with a polyethylene having a melt index between about 0.2 and 30.

---

This invention is concerned with novel elastic films. More particularly, it is directed to elastic films comprising certain thermoplastic elastomeric block copolymers combined with certain polyethylenes.

Recent developments in the field of synthetic elastomers have resulted in the discovery of a novel class of materials which have the stress-strain properties of a vulcanized rubber but which do not require chemical vulcanization in order to attain these properties. These materials are typified by the structure

A—B—A wherein each A is a polymeric block of a monovinyl arene such as styrene while B is a polymeric block of a conjugated diene. While these materials have surprisingly outstanding elastomeric properties such as extremely high tensile strength and can be processed through equipment normally handling only thermoplastic materials such as polyolefins or polyvinyl arenes, they possess certain limitations which it would be of material advantage to improve. Such improvement would permit the use of these new elastomers in many fields in which they are now limited. For example, and presumably due to the double bonds still present in the conjugated diene section of the block copolymer, the materials have the sensitivity to weathering and ozone attack experienced by other elastomeric substances such as the standard SBR rubbers or conjugated diene rubbers in general. While this sensitivity can be reduced in part by the presence of certain antioxidants and antiozonants, this leaves much to be desired. Furthermore, since these self-vulcanizing rubbers are not chemically cross-linked (as occurs during the vulcanization of ordinary rubbers), they are unduly sensitive to the action of a number of organic solvents. This results in either catastrophic dissolution or in weakening and swelling of compositions containing them. Therefore, it would be of material advantage if this solvent sensitivity could be substantially reduced.

Films have been prepared and utilized in large quantities from polyethylene. This is due not only to the low cost of the resin, but also to the clarity of the film and certain desirable physical properties. As with most thermoplastic materials, however, polyethylene inherently possesses certain shortcomings which it would be desirable to improve. For example, the polyethylene films are essentially non-elastic and, if placed under tension, shortly yield and have high permanent set. Moreover, due to their non-elastic character, they do not conform closely to the surfaces of articles wrapped therein. The combination of polyethylene with ordinary rubbers either results in cloudy films, indicating incompatibility, or other lack of satisfactory blending or require vulcanization, adding to the cost of the final product.

It is an object of the present invention to provide improved thermoplastic elastomeric films. It is a further object of the invention to provide improved block copolymer films. It is a specific object of the invention to provide films of block copolymers having enhanced resistance to oxidation, weathering, ozone and solvents. A further specific object is to provide films having a high degree of transparence combined with the desirable properties just referred to as well as elasticity. Other objects will become apparent during the following detailed description of the invention.

Now, in accordance with the present invention, improved films are provided comprising 100 parts by weight of block copolymers having a general configuration

A—B—A wherein each A is a polymer block of a monovinyl arene and B is a polymer block of a conjugated diene preferably having 4–8 carbon atoms per molecule, said block copolymers being more fully defined hereinafter with respect to average molecular weight, combined with 15–400 parts by weight of a polyethylene having a melt index between about 0.2 and 30 at 190° C. In accordance with this invention, it has been found unexpectedly that such films show remarkably improved resistance to oxidation, weathering, ozone and solvents and at the same time are surprisingly clear, indicating the high degree of unexpected compatibility achieved with these two types of polymeric materials. The films so provided are highly elastic in character, in addition to possessing the improvements in physical properties noted above. In accordance with preferred aspects of the invention the polyethylene employed for this purpose has a density at 23° C. between about 0.90 and 0.93. More especially, such polyethylenes preferably have a melt index at 190° C. between about 0.4 and 10.

Especially preferred films of a self-supporting character comprise 100 parts by weight of a block copolymer having the general configuration polystyrene-polybutadiene-polystyrene in conjunction with 20–40 parts by weight of a polyethylene having a melt index at 190° C. between about 0.4 and 10 and a density between about 0.91 and 0.93 grams per cc. at 23° C.

Where in the present specification and claims reference is made to the density of polyethylene, this is based upon A.S.T.M. specification D 1505 expressed in grams per cc. determined at 23° C. The melt index references refer to determinations made in accordance with A.S.T.M. specification D 1238 determined at 190° C.

The presence of polyethylene in conjunction with the block polymers provides a number of unexpected advantages which could not have been predicted from the properties of the individual polymers. The films prepared therefrom not only do not require vulcanization, but in spite of this, have extremely high tensile strength and elasticity as well as other physical properties in addition to sharply enhanced resistance to ozone, weathering, oxidation and solvents. Furthermore, the paramount improvement noted in addition to these advantages is that of a high degree of clarity of the film.

The polyethylenes useful in the films of the present invention should have melt indices between about 0.2 and 30. The polyethylenes having higher melt indices are chiefly useful as processing aids. Since one of the objectives is to prepare self-supporting films of high strength and having satisfactory elastomeric properties, the use of relatively low molecular weight, i.e., high melt index polyethylenes, is not desired in the films of the present invention, except as possible supplements to the type just described.

It is preferred that the melt index at 190° C. of the polyethylene be between about 0.4 and 10. Blends of the polyethylenes may be employed for special reasons.

The process by which these polyethylenes are prepared does not form a part of the present invention. They may, in fact, be prepared by any of the well-known methods such as those described in the book "Polyethylene" by Raff and Allison, Interscience Publishers (1956). Density is determined to a large extent by its method of manufacture but may be affected by after-treatment of the polymer such as by irradiation.

While the invention broadly contemplates the use of 15–400 parts of polyethylene for each 100 parts by weight of the elastomeric block copolymers, it is preferred that proportions between about 20 and 100 parts by weight of fthe polyethylene be employed. If amounts less than about 15% by weight are utilized, the maximum benefits relative to protection from ozone, weathering, oxidation and solvents are not found although improvements are noted. Above about 400 parts by weight of the polyethylene the compositions more nearly resemble a normal thermoplastic non-elastomeric polyethylene instead of the thermoplastic elastomer composition which is desired in the present invention. This is especially true of the relatively low melt index materials which are usually those having relatively high molecular weights. Thus, as the melt index of the polyethylene increases, the proportion which may be incorporated in the compositions of this invention also increases to a certain extent without reaching an objectionable brittle nature which it is desired to avoid.

The elastomeric block copolymers to be combined with polyethylene in accordance with this invention have the general configuration

A—B—A wherein each A is an independently selected polymer block of a monovinyl arene hydrocarbon, the average molecular weight of each block A being between about 8,000 and 45,000, B is a polymer block of a conjugated diene, the average molecular weight of the block being between about 35,000 and 150,000, and the weight of the blocks A together being less than about 38% of the total weight of the block copolymer.

Certain leeway may be gained in the average molecular weight of each of the blocks by modification of the composition with compatible extending oils at least insofar as the center elastomeric copolymer block B is concerned. Thus, the compositions may then be defined as those compirsing 0–100 parts by weight of a compatible polymer extending oil, 0–100 parts by weight of polymers such as polystyrene, 100 parts by weight of the block copolymer described above and 15–400 by weight of the subject polyethylenes. The conjugated diene polymer block B of the block copolymer may then have the average molecular weight between about Y(350–1500) wherein Y is a number between the parts by weight of the block copolymer and the sum of the parts by weight of extending oil, if present, plus the weight of the block copolymer. In effect, this means that the average molecular weight of the center elastomeric block of the block copolymer may be increased with increasing proportions of extender oil.

While block copolymers having a broader range of average molecular weights in the individual blocks may be prepared and utilized, the types referred to above insofar as their average molecular weights are concerned are those in which the maximum and optimum combination of desirable physical properties is found. Where in the present invention reference is made to average molecular weights of the block copolymers, this will be understood to refer to average molecular weights determined preferably by intrinsic viscosity measurements as they are related graphically to osmotic molecular weights. These are closely coordinated with molecular weights obtained by analysis of end group—tritiated samples of the polymer, the samples being withdrawn and treated with tritiated methanol at any given stage in the polymerization process as desired. For example, the molecular weights of the polyvinyl arene blocks may be determined by withdrawal of a sample at the end of the step in the process in block polymerization forming the first polyvinyl arene block, the lithium-terminated polymer block being treated at this time with tritiated methanol, whereby the lithium radical is replaced with tritium and thereafter counting the tritium preferably in a scintillation counter.

The elastomeric center block may be prepared from conjugated dienes such as isoprene, butadiene and the like although isoprene and butadiene are preferred. The non-elastomeric end blocks of monovinyl arene hydrocarbons comprise especially styrene, vinyl toluene, and vinyl xylene, although styrene is preferred. Thus, the preferred species comprise polystyrene-polybutadiene-polystyrene and polystyrene-polyisoprene-polystyrene.

Block copolymers containing less vinyl or 1,2 addition configuration consistent with the production of economically low cost polymers are prepared by the use of lithium-based initiators which are capable of being utilized in non-polar media, since it has been found that the utilization of certain other lithium-based initiators require the use of polar compounds such as ethers and the like to permit satisfactory polymerization. The presence of even a small amount of ether in the reaction mixture, however, promotes the formation of center blocks having a substantially increased vinyl or 1,2 addition content strongly affecting the properties of the products so obtained. Therefore, the lithium-based catalysts useful for this purpose, when a low vinyl structure is of paramount importance, include lithium metal, alkyl lithiums and certain other lithium compounds described in the literature and known to experts in the art. Alkyl lithium compounds are preferred, particularly those having up to 8 carbon atoms per molecule including butyl lithiums, amyl lithiums and their homologues. In order to promote the low vinyl content, inert hydrocarbon solvents are preferred, such as alkenes or lower alkanes, although certain aromatic hydrocarbons such as benzene and the like may be utilized. Cycloaliphatic hydrocarbons such as cyclohexane and their mixture with aromatics or aliphatics, e.g., benzene, may be employed.

Polymerization is normally conducted at temperatures in the order of —20 to about 100° C., preferably between about 20 and 65° C. The proportion of initiator should be maintained at a level which is determined by the purity of the solvent on the one hand and the desired molecular weight of the polymer block on the other. Certain impurities in the solvents, particularly acetylenic impurities and the like, will consume catalyst which then takes no part in the polymerization. Since the usual proportion of initiator will be in the order of 1–200 parts per million based on the weight of monomers present, it will be seen that even a small amount of impurities may drastically reduce the initial concentration of the catalyst. According to the preferred process, the first block segment of vinyl arene is prepared and polymerization conducted to a predetermined extent after which the conjugated diene monomer, capable of forming the elastomeric center block is injected. After polymerization of the second (elastomic) segment, an additional amount of a vinyl arene is introduced to effect block polymerization of the second terminal thus forming the block copolymer A—B—A.

Following completion of the block polymerization, the polymer, usually existing in the form of a cement, is coagulated by the use of steam or hot water or both in such a manner as to result in the formation of crumbs which are then separated from the aqueous environment and subjected to dewatering and drying conditions. Prior to such coagulation it is desirable to terminate polymerization with such materials as alcohols or other proton donor substances.

As stated hereinbefore, the block copolymers possess the unique characteristic of being "self-curing," by which is meant that the product assumes the properties of a vulcanized elastomer without actual cross-linking. Consequently, they may be used directly after their formation without vulcanization. Because of this, they are potentially capable of shaping in high speed molding and extruding apparatus, such as film extrusion and the like. This is only true in the present instance since the proportion of terminal groups to center groups and the average molecular weight of each of the groups has been carefully designed to promote both the properties necessary for injection molding purposes and those necessary for self-vulcanized elastomeric polymers.

Due to the unexpectedly high transparency of the films made from the two described polymers, and due, moreover, to the highly elastic nature of these films combined with the improved physical properties referred to hereinbefore, many large scale end uses for the films are contemplated. These include packaging or wrapping of food, clothing, dry goods, etc., films for use as agricultural mulch as well as moisture barriers under concrete or on top of new concrete during the curing period; as liners for boxes, drums or multi-layer bags and for other well known uses in which polyethylene films now find a large market.

The films may be prepared by any of the known film forming methods comprising blown film, extruded film or cast film processes. The product shows a substantial reduction in blocking from that experienced with the unmodified block copolymer and also reduced slip as compared with unmodified polyethylene. The films of this invention may be treated for special purposes, for example, they may be oriented in either direction by stretching within the temperature range of about 100–125° C. in either direction. Furthermore, and also within this approximate temperature range, the film may be shrunk by 10–50% of its original area to conform to the shape and surface of any article wrapped therein such as poultry and the like. The advantages of orientation and of heat shrinkage are well known in these art and the compositions of the present invention are unexpectedly compatible with each other for treatment for each of these two purposes.

The compositions for later film formation may be prepared by milling the solid materials, tumbling pellets of the individual components, or by solution blending as well as combinations of these procedures. Films may be extruded at relatively moderate temperatures in the order of 300–400° F. Since the films are highly elastic, it is possible to draw down better than unmodified polyethylene and increase extrusion rates over those normally required when forming film from polyethylene.

The following example illustrates the advantages of the present invention.

EXAMPLE I

Blends of polyethylene and block copolymers were prepared by tumbling pellets in a cement mixer and extruding into film. Properties of the films are as follows in Table I below. The block copolymer had the structure polystyrene-polybutadiene-polystyrene, the block molecular weights being 9,000–45,000–9,000. The polyethylene had a density of about 0.92 and a melt index of about 1.2.

TABLE I.—PHYSICAL PROPERTIES OF BLOCK COPOLYMER POLYETHYLENE FILM

| Percent block copolymer | Percent polyethylene | Modulus at 10% elongation | Modulus at 300% elongation | Modulus at 500% elongation | Tensile strength at break | Elongation at break, percent | Tensile set at break, percent | Trouser tear, pounds per linear inch | Angle "C" tear, pounds per linear inch | Notched "D" crescent tear, pounds per linear inch |
|---|---|---|---|---|---|---|---|---|---|---|
| 100 | 0 | 130 | 330 | 540 | 5,000 | 970 | 10 | 60 | 120 | 80 |
| 83 | ¹17 | 180 | 480 | 770 | 3,600 | 900 | 40 | 80 | 150 | 210 |
| 50 | 50 | 400 | 940 | 1,440 | 2,900 | 750 | 200 | 350 | 260 | 240 |
| 20 | 80 | 700 | 1,500 | | 2,400 | 520 | 330 | 270 | 330 | 390 |
| 0 | 100 | 730 | 1,990 | | 2,600 | 470 | 420 | 490 | 350 | 200 |

¹ 20 phr.
NOTE.—Physical property values are averages of test pieces cut parallel and normal to extrusion direction.

Samples of film were stretched 25% and exposed to direct sunlight as indicated in Table II.

TABLE II.—PHYSICAL PROPERTIES OF FILM DURING OUTDOOR AGING
[Samples stretched 25% during weathering]

| | Time aged, days | Modulus at 10% elongation | Modulus at 300% elongation | Modulus at 500% elongation | Tensile strength at break | Elongation at break, percent |
|---|---|---|---|---|---|---|
| Block copolymer | 0 | 130 | 330 | 540 | 5,000 | 970 |
| | 1 | 200 | 440 | 1,250 | 2,330 | 760 |
| | 2 | 90 | 420 | | 630 | 310 |
| | 5 | | | | 440 | 10 |
| | 12 | | | | 250 | <10 |
| Block copolymer with 20 phr. polyethylene | 0 | 180 | 480 | 770 | 3,600 | 900 |
| | 1 | 180 | 580 | 1,000 | 2,880 | 790 |
| | 2 | 130 | 740 | | 1,400 | 480 |
| | 5 | 750 | | | 1,170 | 100 |
| | 12 | | | | 1,230 | 90 |
| Polyethylene | 0 | 730 | 1,990 | | 2,640 | 460 |
| | 2 | 580 | 1,940 | | 2,700 | 500 |
| | 5 | 800 | | | 2,600 | 480 |
| | 12 | | 2,200 | | 2,750 | 460 |

We claim as our invention:

1. A transparent unsupported film of
   (a) 100 parts by weight of a block copolymer having the configuration:
       poly(monovinyl)arene - poly(conjugated diene)-poly(vinyl arene) wherein each poly(monovinyl) arene block has an average molecular weight between about 8,000 and 45,000 and the poly(conjugated diene) block has an average molecular weight between about 35,000 and 150,000; the weight of the blocks A together being less than about 38% of the total weight of the block copolymer and
   (b) 15–400 parts by weight of a polyethylene having a melt index between about 0.2 and 30 at 190° C. and a density at 23° C. between about 0.90 and 0.93.
2. A film according to claim 1 wherein the block copolymer is polystyrene-polybutadiene-polystyrene.
3. A film according to claim 1 wherein the block copolymer is polystyrene-polyisoprene-polystyrene.

References Cited

UNITED STATES PATENTS

| 3,231,635 | 1/1966 | Holden et al. | 260—876 |
| 3,242,038 | 3/1966 | Dallas et al. | |
| 3,294,868 | 12/1966 | Pritchard | 260—876 |

GEORGE F. LESMES, Primary Examiner

K. E. KUFFNER, Assistant Examiner

U.S. Cl. X.R.

47—9; 99—171, 181; 260—33, 41